(12) United States Patent
Yun et al.

(10) Patent No.: US 6,343,196 B1
(45) Date of Patent: Jan. 29, 2002

(54) IMAGE FORMING APPARATUS AND DRIVING METHOD THEREOF

(75) Inventors: Jin-su Yun; Kyoung-cheol Min, both of Suwon (KR)

(73) Assignee: Samsung Electronics Co., Ltd., Suwon (KR)

(*) Notice: Subject to any disclaimer, the term of this patent is extended or adjusted under 35 U.S.C. 154(b) by 0 days.

(21) Appl. No.: 09/672,969

(22) Filed: Sep. 29, 2000

(30) Foreign Application Priority Data

Jan. 26, 2000 (KR) .......................................... 2000-3668

(51) Int. Cl.⁷ .............................................. G03G 15/00
(52) U.S. Cl. ........................................... 399/81; 399/76
(58) Field of Search ............................... 399/9, 38, 43, 399/75, 76, 81; 340/679

(56) References Cited

U.S. PATENT DOCUMENTS 5,768,657 A * 6/1998 Kimura et al. ................. 399/81
5,974,284 A * 10/1999 Sato et al. ..................... 399/76

* cited by examiner

*Primary Examiner*—Sophia S. Chen
(74) *Attorney, Agent, or Firm*—Robert E. Bushnell, Esq.

(57) ABSTRACT

An image forming apparatus and a driving method thereof are provided. A controller for controlling the image forming apparatus includes a central processing unit (CPU) for performing an initialization process when a reset signal is input, a display device control unit for controlling the display device, and an initial display control unit for controlling the display device control unit so that certain display information may be displayed on the display device while the CPU performs the initialization process when the reset signal is input, in which the display device control unit displays display information input from the CPU on the display device after the initialization process. The image forming apparatus and the driving method thereof can convey set display information to a user via the display device even during the process of initializing a system beginning when power is supplied.

19 Claims, 5 Drawing Sheets

FIG. 1 *(Related Art)*
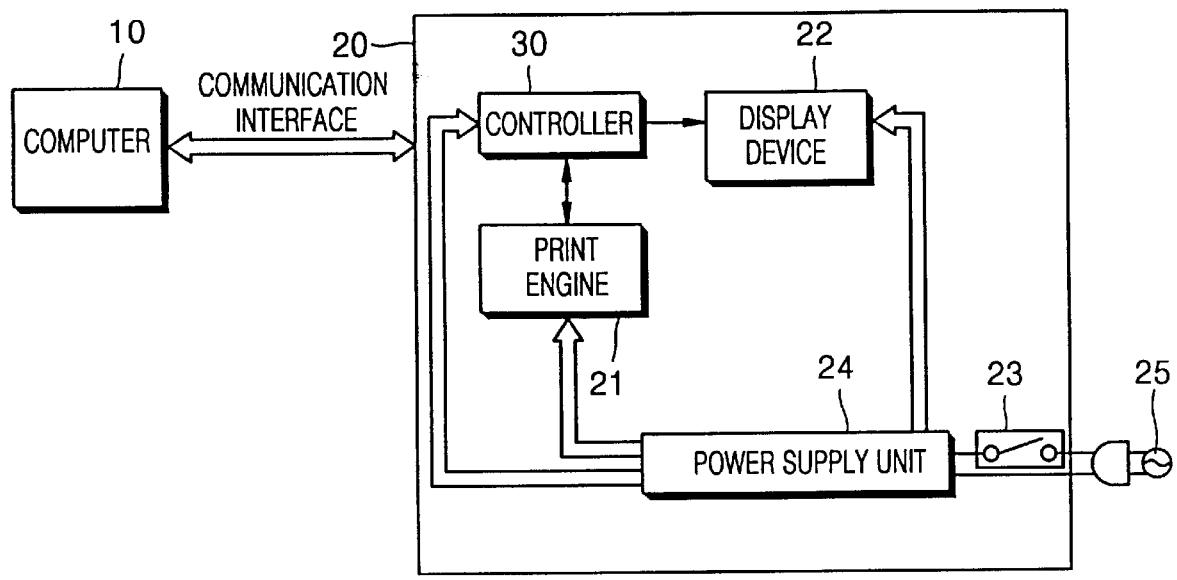
FIG. 2 *(Related Art)*
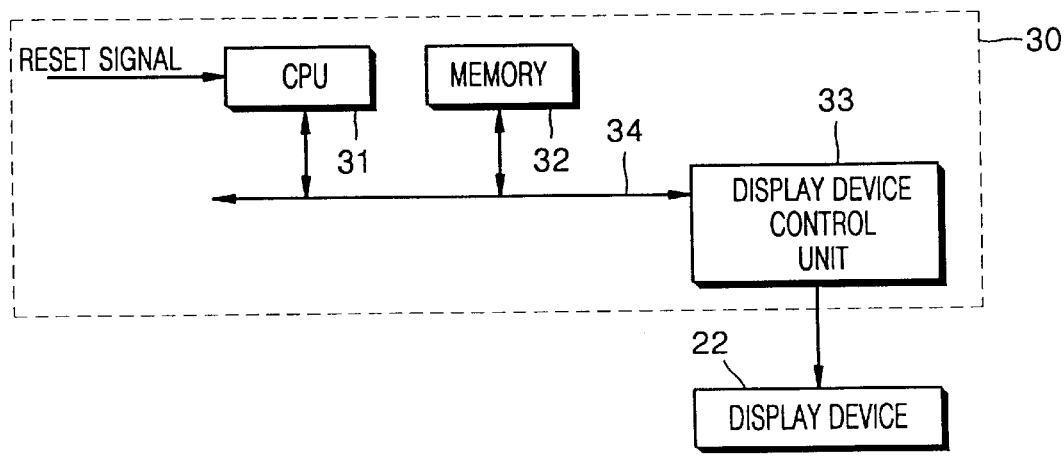

IMAGE FORMING APPARATUS AND DRIVING METHOD THEREOF

CLAIM OF PRIORITY

This application makes reference to, incorporates the same herein, and claims all benefits accruing under 35 U.S.C. §119 from my application IMAGE FORMING APPARATUS AND METHOD OF OPERATING THE SAME filed with the Korean Industrial Property Office on Jan. 26, 2000 and there duly assigned Serial No. 00-3668.

BACKGROUND OF THE INVENTION

1. Field of the Invention

The present invention relates to an image forming apparatus, and more particularly, to an apparatus capable of displaying appropriate display information even during the system initialization process, and a driving method thereof.

2. Description of the Related Art

An image forming apparatus prints an image corresponding to received print data on a paper in a device such as a copier, printer, or facsimile. Generally, image forming apparatuses comprise a display device and a central processing unit (CPU), where the CPU controls what is displayed on the display device. However, when an image forming apparatus is powered on, the image forming apparatus goes through an initialization or booting process. During this initialization process, often there is no display on the display screen. Occasionally, the initialization process fails and the user has no way of knowing what happened to the image forming apparatus as nothing is displayed on the display screen.

What is needed is an apparatus and a method for displaying information on the display during the initialization process. What is also needed is a method and apparatus for displaying an error message on the display screen should the initialization process fail.

SUMMARY OF THE INVENTION

It is therefore an object of the present invention to display information on a display device during an initialization process performed after power is applied to an image forming apparatus.

It is also an object to provide an error message on the display device of an image forming apparatus if the initialization process should be unsuccessful.

It is further an object to provide a new design for the controller of an image forming apparatus that allows messages to be displayed on the display device of an image forming apparatus while the image forming apparatus is being initialized.

It is still further an object to provide a new design for the controller of an image forming apparatus that allows error messages to be displayed on the display device of the image forming apparatus should the initialization process be unsuccessful.

It is yet an object of the present invention to provide an image forming apparatus and a driving method thereof, which is capable of displaying its operation status on a display device even while the image forming apparatus performs an initialization process.

A first aspect of the present invention is achieved by an image forming apparatus having a controller for controlling the image forming apparatus, a print engine for printing an image controlled by the controller on a printer, and a display device for displaying received display information. The controller includes a central processing unit (CPU) for controlling a system and performing an initialization process when a reset signal is input, a display device control unit for controlling the display device, and an initial display control unit for controlling the display device control unit so that set display information may be displayed on the display device while the CPU performs the initialization process when the reset signal is input, in which the display device control unit displays display information input from the CPU on the display device after the initialization process.

A second aspect of the present invention is also achieved by an image forming apparatus. Here, an initialization diagnostic unit is implemented instead of an initial display control unit for controlling the display device control unit so that an error message may be displayed in the display device when an initialization process completion signal is not input from the CPU during a first time period based on time during which a reset signal is input.

A third aspect of the present invention is achieved by a method for driving an image forming apparatus, which comprises the steps of: determining whether or not a reset signal is input via an initial display control unit for controlling a display device control unit so that set display information may be displayed on a display device; displaying display information set by controlling a display device control unit for displaying received display information on the display device while an initialization process is performed when it is determined that the reset signal is input; and displaying display information received from a central processing unit (CPU) for controlling a system, after the initialization process is completed.

A fourth aspect of the present invention is also achieved by a method for driving an image forming apparatus. The method for driving an image forming apparatus comprises the steps: determining whether or not a reset signal is input via an initialization diagnostic unit for controlling a display device control unit together with a central processing unit (CPU); determining whether an initialization process completion signal is input from the CPU during a set first time period when it is determined that the reset signal is input; and controlling the display device control unit so that an error message may be displayed in a display device when an initialization process completion signal is not input during the first time period.

BRIEF DESCRIPTION OF THE DRAWINGS

A more complete appreciation of the invention, and many of the attendant advantages, thereof, will be readily apparent as the same becomes better understood by reference to the following detailed description when considered in conjunction with the accompanying drawings in which like reference symbols indicate the same or similar components, wherein:

FIG. 1 is a block diagram illustrating a conventional image forming apparatus;

FIG. 2 is a block diagram illustrating the configuration of a conventional controller;

DETAILED DESCRIPTION OF THE INVENTION

Figure 3:
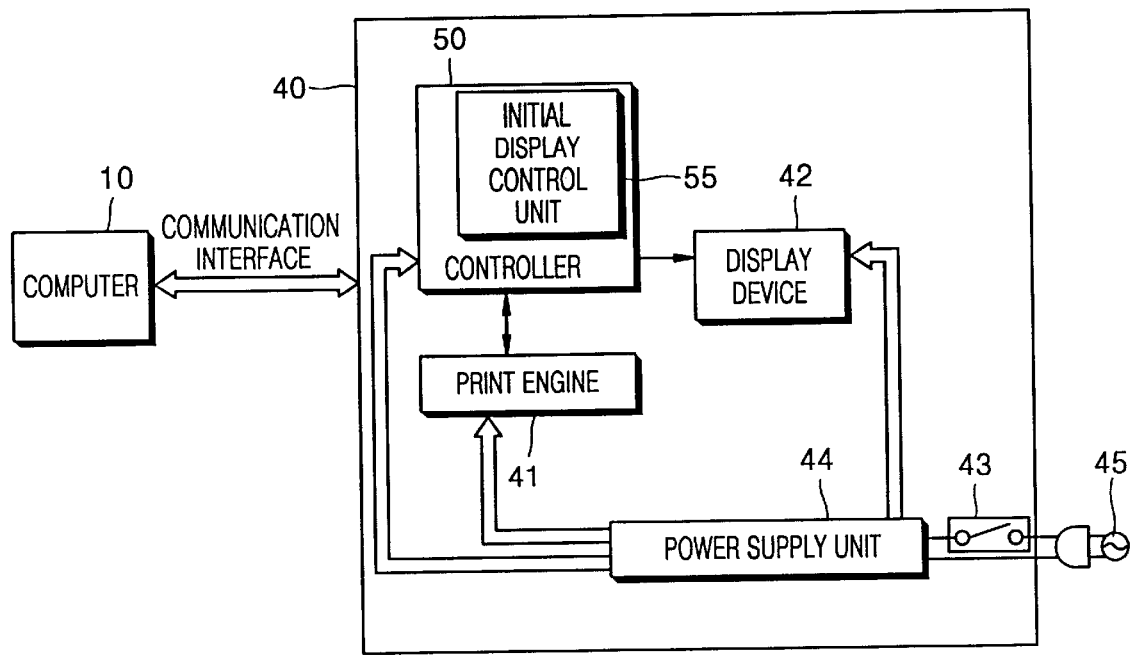
FIG. 3 is a block diagram illustrating an image forming apparatus according to a preferred embodiment of the present invention.

Turning to the figures, FIG. 1 illustrates a conventional image forming apparatus 20 connected to a computer 10 via a communication interface. The image forming apparatus 20 includes a controller 30, a print engine 21, a display device 22, and a power supply unit 24. Here, a power supply unit 24 receives power from an external source 25 and delivers the power to each component of the image forming apparatus 20. A reference numeral 23 denotes a power switch. The controller 30 controls the print engine 21 so as to print an image corresponding to print data received from the computer 10 via the communication interface, on a paper. The controller 30 also controls the display device 22.

Referring to FIG. 2, the controller 30 mainly includes a central processing unit (CPU) 31, a memory 32, and a display device control unit 33. A reference numeral 34 denotes a bus. The memory 32 stores a program related to the operation of the image forming apparatus 20. The display device control unit 33 controls the display device 22 whereon display information received from the CPU 31 may be displayed.

Likewise, the operation of the controller 30 controlled exclusively by the CPU 31 will be described as follows. When a power switch 23 is turned on, the power supply unit 24 begins to power each component of the image forming apparatus 20. When the power supply unit 24 starts delivering power normally, a reset signal is output to the CPU 31 from a reset circuit (not shown) in the controller 30, and the CPU 31 initializes system while the reset signal is input.

During the system initialization process, which is generally referred to as a booting process, an internal configuration is adjusted by a stored BIOS program so that the CPU 31 may operate each component of the image forming apparatus 20. In the controller 30, the CPU 31 does not control the display device control unit 33 during the initialization process. Consequently, there is no display information in the display device 22 during the initialization process.

When the initialization process is completed, a print ready status, indicating that print work can be normally performed, is displayed on the display device 22. It normally takes from several tens of seconds to several minutes for the initialization process to be performed. When the initialization process is completed, the operating program is executed, and the display information informing the operation status of the image forming apparatus 20 by execution of the operating program is displayed on the display device 22 via the display device control unit 33. That is, in the controller 30, display information is displayed on the display device 22 after the initialization process is completed by the CPU 31. As a result, while the controller 30 performs the initialization process, or in a case where the initialization process is not normally performed due to the occurrence of an internal error during the initialization process, it is impossible for a user to check information on the present operation status of the image forming apparatus 20 via the display device 22.

Referring to FIG. 3, an image forming apparatus 40 according to a preferred embodiment of the present invention is connected to a computer 10 via a communication interface. The image forming apparatus 40 includes a controller 50, a print engine 41, a display device 42, and a power supply unit 44. The power supply unit 44 receives power from an external source 45 and delivers the power to each component of the image forming apparatus 40. A reference numeral 43 denotes a power switch. The controller 50 controls the print engine 41 so as to print an image corresponding to print data received from the computer 10 via the communication interface, on a paper. The controller 50 also controls the display device 42. The controller 50 includes an initial display control unit 55 functioning so that certain display information may be displayed on the display device 42 while power is delivered from the power supply unit 44 and an initialization process is internally performed.

Figure 4:
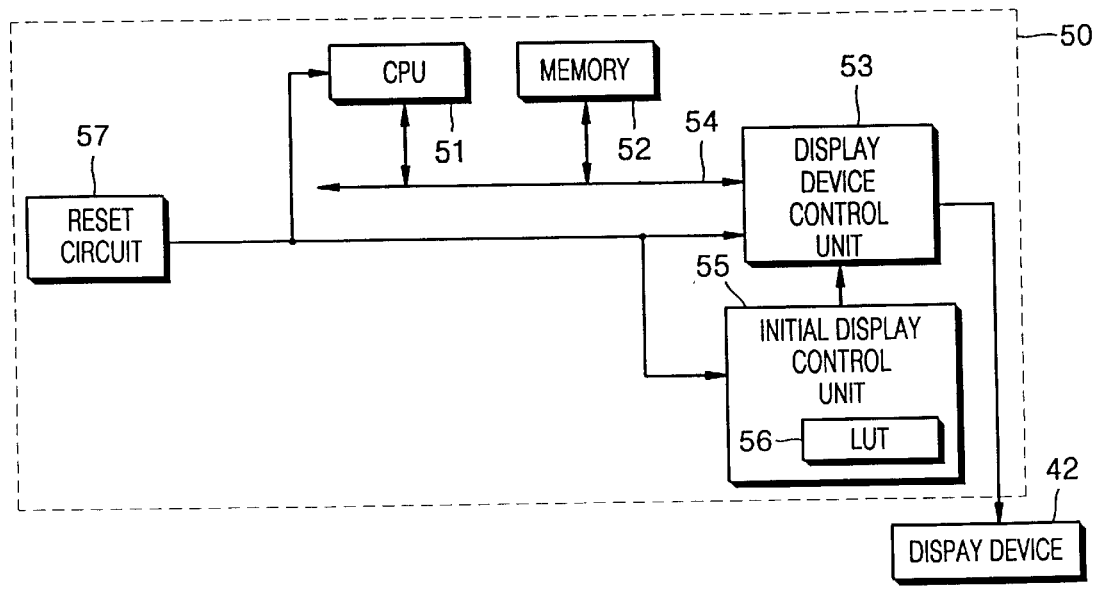
FIG. 4 is a block diagram illustrating the controller of FIG. 3 in more detail.
Figure 5:
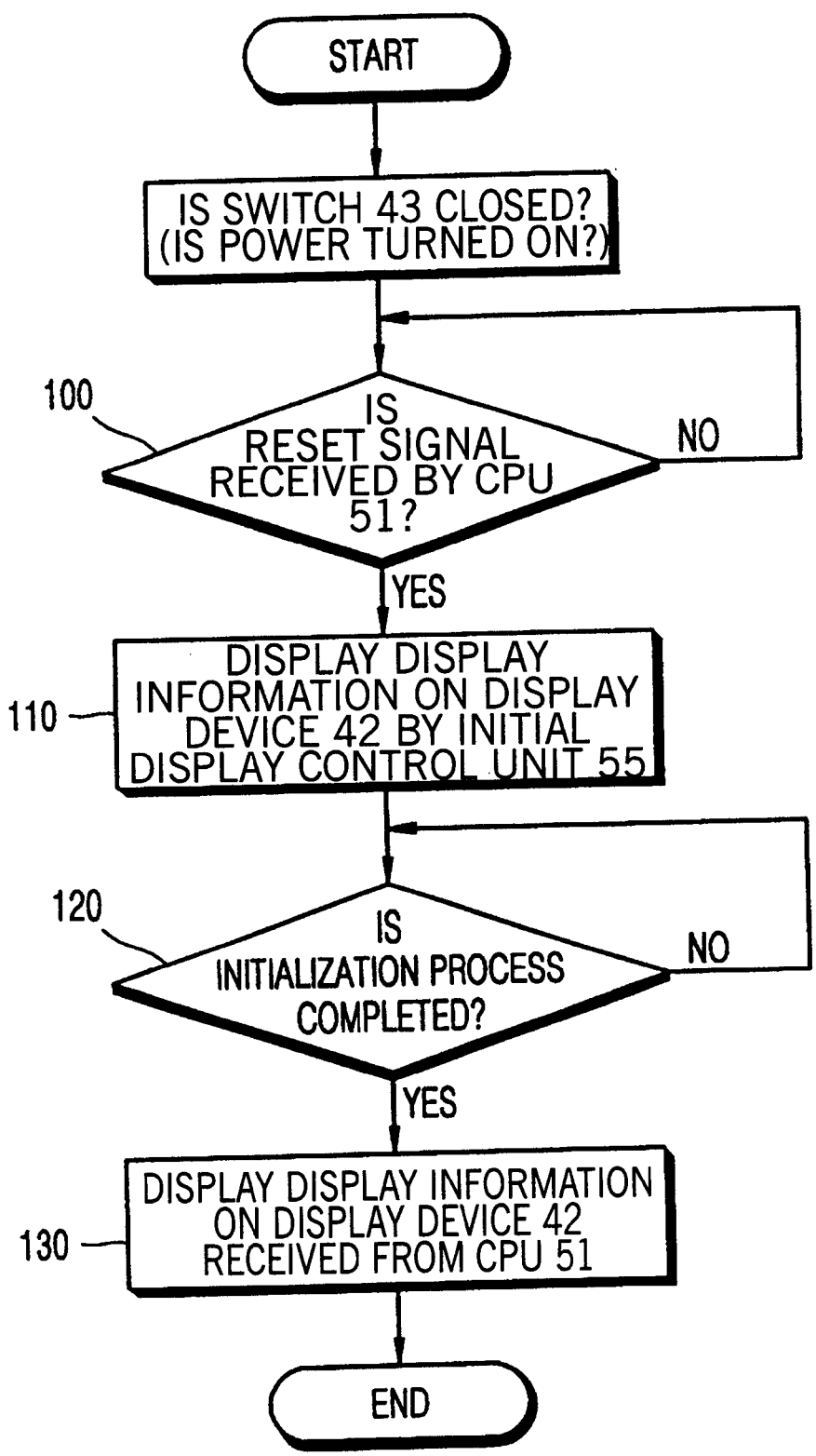
FIG. 5 is a flowchart illustrating the operation process of the controller of FIG. 4.

Referring to FIG. 4, the controller 50 includes a central processing unit (CPU) 51, a memory 52, and a display device control unit 53, an initial display control unit 55, and a reset circuit 57. A reference numeral 54 denotes a bus. The memory 52 controlled by the CPU 51 stores various programs including an operating program required for the operation of the image forming apparatus 40. The display device control unit 53 connected to the CPU 51 via the bus 54 is wired to the initial display control unit 55 so that it is controlled by the initial display control unit 55. When the power supply unit 44 begins to deliver power, the reset circuit 57 in the controller 50 sends a reset signal to the CPU 51, display device control unit 53, and initial display control unit 55 in which a certain process is performed while the reset signal is input. The CPU 51 performs an initialization process when power is supplied and the reset signal is input from the reset circuit 57.

The initial display control unit 55 controls the display device control unit 53 so that certain display information may be displayed in the display device 42 when the reset signal is input. A period required for the initial display control unit 55 to control the display device control unit 53 is decided within the time required to complete the initialization process, a preparatory process that allows the CPU 51 to execute an operating program. Here, the initial display control unit 55 may be designed in a manner such that a timer (not shown) is added to the initial display control unit 55 and the display information may be displayed on the display device 42 only for a certain period based on the reset signal input. Afterwards, the initial display control unit 55 is prevented from interrupting the display device control unit 53. Alternatively, an initialization process completion signal received from the CPU 51, may be sent to the initial display control unit 55 thereby terminating control of the display device control unit 53 when the initialization process completion signal is input or the initialization process completion signal may be output to the display device control unit 53 from the CPU 51, and an internal circuit is implemented so that the display device control unit 53 may ignore a control signal of the initial display control unit 55 and display display information received from the CPU 51 on the display device 42 after the initialization process completion signal is input.

A look-up table (LUT) 56 records data to be displayed on the display device 42 when performing the initialization process, such as data corresponding to "initialization in progress". Alternatively, the initial display control unit 55 may control the display device control unit 53 so that data to be indicated on the display device 42 during the initialization process may be recorded either in the memory 52 connected to the display device control unit 53 via the bus 54, or in a separate memory (not shown) wired to the display device control unit 53 so that the data to be indicated on the display device 42 during the initialization process are read by the display device control unit 53 enabling the data to be displayed.

The operation process of the controller 50 having the above configuration will be described with reference to FIG.

5. When a power switch 43 is turned on, and the power supply unit 44 begins supplying power, it is checked whether the reset signal is output from the reset circuit 57 to CPU 51 (step 100) or not. When the reset signal is generated, the CPU 51, display device control unit 53, and initial display control unit 55 begins to operate. Also, the CPU 51 is synchronized with the reset signal and performs the initialization process, and the initial display control unit 55 operates independently from the CPU 51 to control the display device control unit 53 so that information recorded in the LUT 56 may be displayed on the display device 42 (step 110). Then, it is determined whether the initialization process of the CPU 51 is completed (step 120) or not. The determination of the initialization process completion is performed by one of the methods described above. Next, after the initialization process of the CPU 51 is completed, the display device control unit 53 displays display information received from the CPU 51 on the display device 42 (step 130). According to the image forming apparatus 40, display progress information is generated by the initial display control unit 55 even while the CPU 51 performs the initialization upon receipt of the reset signal triggered from power supply unit 44, and it may be conveyed to the user via the display device 42.

Figure 6:
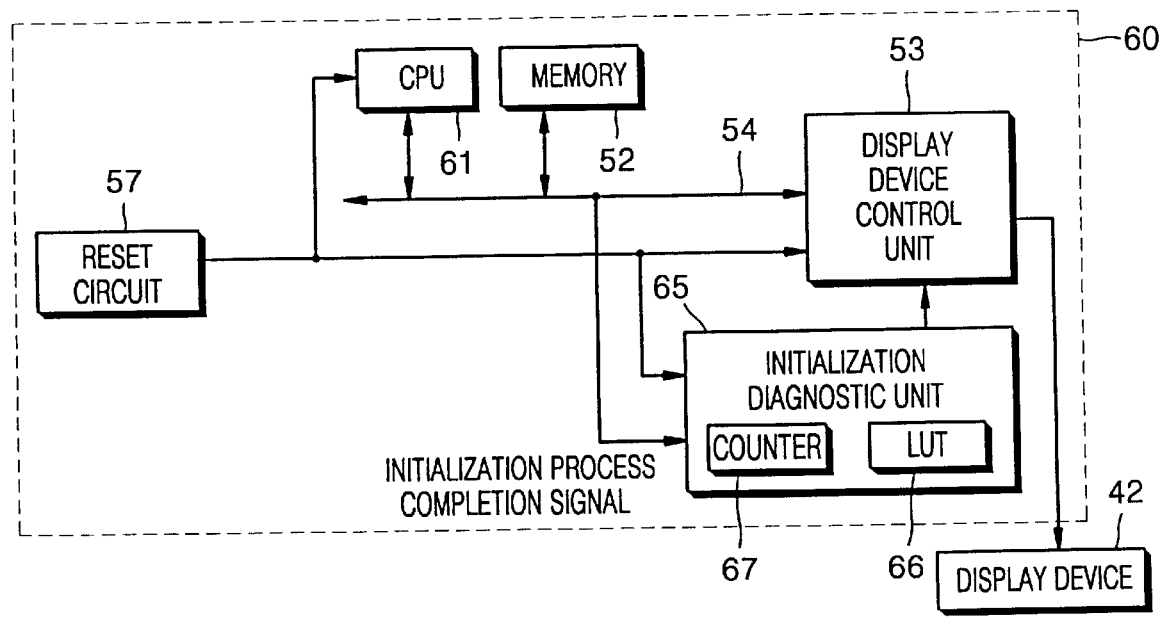
FIG. 6 is a block diagram illustrating the controller of the image forming apparatus according to another preferred embodiment of the present invention.

Referring to FIG. 6, the controller 60 of the image forming apparatus according to another preferred embodiment of the present invention includes a CPU 61, a memory 52, a display device control unit 53, and an initialization diagnostic unit 65. Here, elements having the same function as elements are denoted by the same reference numerals. The CPU 61 performs the initialization process of initializing system when external source 45 begins supplying power to the power supply unit 44 and the reset signal is output from reset circuit 57 to CPU 61. When the initialization process is normally completed, an initialization process completion signal is output from CPU 61 to the initialization diagnostic unit 65.

The initialization diagnostic unit 65 controls the display device control unit 53 so that display information such as an error message, for example, "booting error" may be displayed in the display device 42 when the initialization process completion signal is not output from the CPU 61 during a first time period initiated when the reset signal is input to CPU 61. The initialization diagnostic unit 65 includes a counter 67 for counting down the first time period, and a look-up table (LUT) 66 in which the error message is recorded. The error message may also be recorded in the memory 52 which can be controlled by the display device control unit 53. The counter 67 starts counting time upon receipt of the reset signal output from the reset circuit 57 and imputted to CPU 61.

Figure 7:
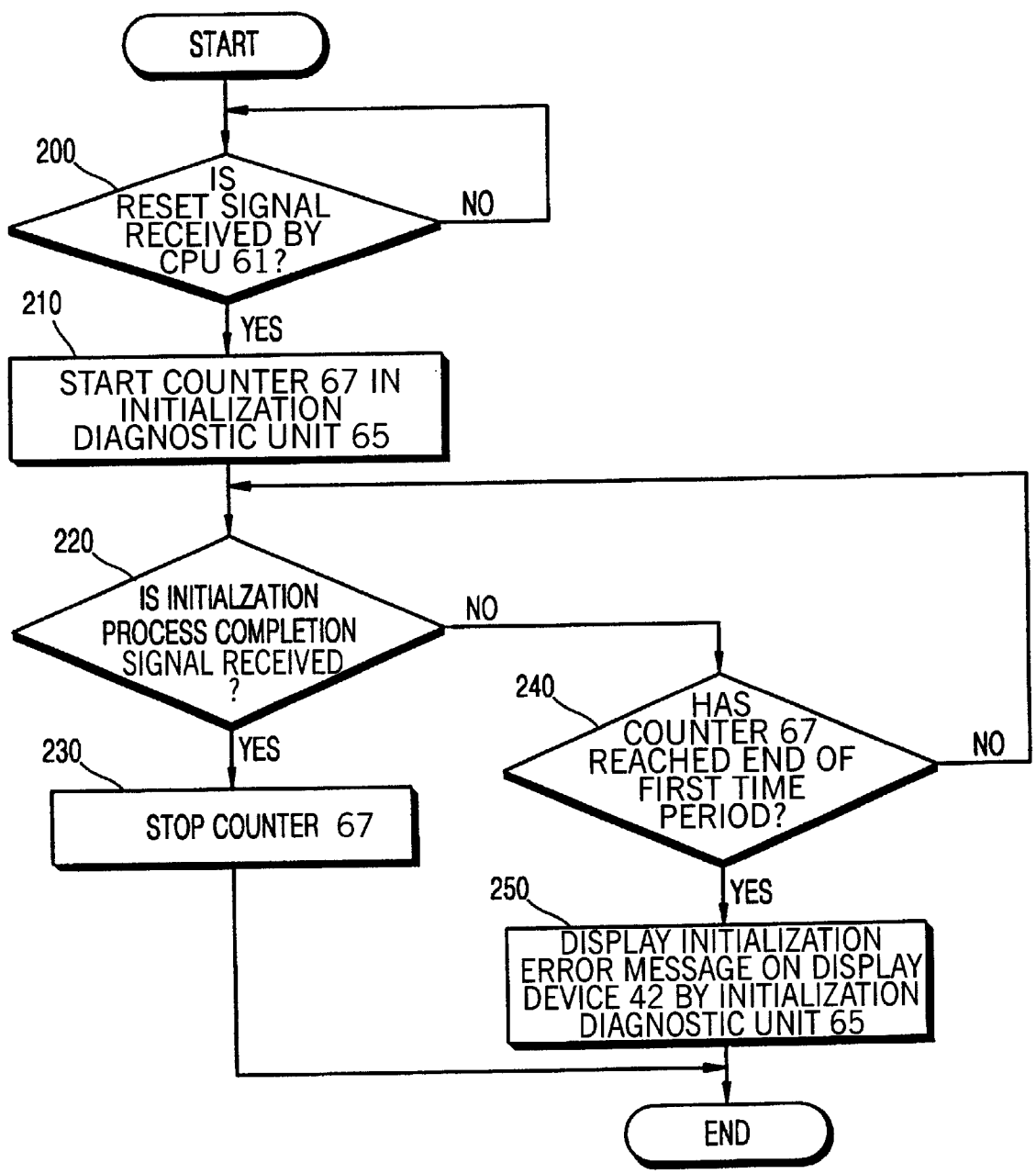
FIG. 7 is a flowchart illustrating the operation process of the controller of FIG. 6.

The operation process of the controller 60 is described with reference to FIGS. 6 and 7. First, it is determined whether a reset signal is input to CPU 61 (step 200) or not. The reset signal is generated from the reset circuit 57 when a power switch 43 (see FIG. 3) is turned on allowing power to be delivered from external source 45 to power supply unit 44 (see FIG. 4). When the reset signal is input to the CPU 61, the display device control unit 53 and the initialization diagnostic unit 65 start operating. Here, when the reset signal is input to the CPU 61, CPU 61 performs the initialization process, and the counter 67 operating independently from the CPU 61 counts time (step 210). When it is determined that the initialization process completion signal is output from the CPU 61 to initialization diagnostic unit 65 (step 220) before time counted by the counter 67 reaches the end of the first time period, the counter 67 stops (step 230).

At this point, the initialization diagnostic unit 65 no longer controls the display device control unit 53 and terminates its implementation.

On the contrary, when it is determined that a time-out signal is generated, by which time counted by the counter 67 has reached the end of the first time period while the initialization process completion signal is not input to initialization diagnostic unit 65 from CPU 61 in the step 240, the initialization diagnostic unit 65 controls the display device control unit 53 so that the error message recorded in the look-up table 66 may be displayed on the display device 42 (step 250). According to the process, when an error occurs during the initialization process by the CPU 61, the user can check the error via the display device 42.

Preferably, the initialization diagnostic unit 65 controls the display device control unit 53 so that display information illustrating that the initialization process is in progress on display device 42 during the time between when a reset signal is sent from reset circuit 57 to CPU 61 and before the expiry of the first time period or receipt of an initialization process completion signal from CPU 61 to initialization diagnostic unit 65. Upon successful completion of the booting process, an initialization process completion signal is received by the initialization diagnostic unit 65 from CPU 61, and a message informing that the initialization process is completed, stored in LUT 66 of the initialization diagnostic unit 65, may be displayed on display unit 42.

As described above, the present invention can inform a user of certain display information via the display device even during the system initialization process. Although the invention has been described with reference to particular embodiments, it will be apparent to one of ordinary skill in the art that modifications to the described embodiments may be made without departing from the spirit and scope of the invention. Thus, the true technical protection scope of the present invention must be determined by the attached claims.

What is claimed is:

1. An image forming apparatus having a controller for controlling the image forming apparatus, a print engine for printing an image controlled by the controller, and a display device for displaying received display information, wherein said controller comprises;
    a central processing unit (CPU) for controlling an initialization process when a reset signal is received by said CPU;
    a display device control unit for controlling said display device; and
    an initial display control unit for controlling said display device control unit so that certain display information may be displayed on said display device while said CPU performs said initialization process when said reset signal is received by said CPU, wherein said display device control unit displays display information from said CPU on the display device after said initialization process.

2. The controller of claim 1, wherein said certain display information displayed on said display device while said CPU performs said initialization process is stored within a look-up table in said initial display control unit.

3. The controller of claim 1, wherein said certain display information displayed on said display device while said CPU performs said initialization process is stored within a memory unit located within said controller and connected to said display device control unit via a bus.

4. The controller of claim 1, wherein said initial display control unit operates independently of said CPU prior to completion of said initialization process.

5. A method for driving an image forming apparatus, comprising the steps of:
- determining whether or not a reset signal is received by either a central processing unit (CPU) or an initial display control unit;
- displaying certain display information on a display device via a display device control unit and said initial display control unit while an initialization process is performed and after it is determined that said reset signal is received by either said CPU or said initial display control unit; and
- displaying display information received from said CPU after said initialization process is completed.

6. The method of claim 5, wherein said step of determining whether or not a reset signal is received is preceded by the step of turning on power to said image forming apparatus.

7. The method of claim 5, wherein said step of displaying display information received from said CPU after said initialization process is completed is preceded by the step of sending an initialization process completion signal from the CPU to the initial display control unit, thereby terminating control of said display device control unit by said initial display control unit.

8. The method of claim 5, wherein said step of displaying display information received from said CPU after said initialization process is completed is preceded by the step of sending an initialization process completion signal from the CPU to the display device control unit so that said display device control unit may ignore further commands generated from said initial display control unit.

9. An image forming apparatus having a controller for controlling the image forming apparatus, a print engine for printing an image controlled by the controller, and a display device for displaying received display information, wherein said controller comprises:
- a central processing unit (CPU) for performing an initialization process when a reset signal is received by said CPU;
- a display device control unit for controlling said display device; and
- an initialization diagnostic unit for controlling said display device control unit so that an error message may be displayed on said display device absent receipt of an initialization process completion signal by either said initialization diagnostic unit or said display device control unit from said CPU after an expiration of a predetermined time period after said reset signal is received by said CPU.

10. The controller of claim 9, wherein said initialization diagnostic unit comprises a counter for determining said predetermined time period.

11. The controller of claim 9, wherein said initialization diagnostic unit comprises a look-up table that contains said error message to be displayed on said display device.

12. The controller of claim 11, wherein said initialization diagnostic unit controls said display device via said display device control unit after said receipt of said reset signal by said CPU and prior to either said expiration of said predetermined time period or prior to receipt of said initialization process completion signal by either said initialization diagnostic unit or said display device control unit from said CPU.

13. The controller of claim 12, wherein said look-up table further comprises messages pertaining to progress of said initialization process to be displayed on said display unit prior to said expiration of said predetermined time period and prior to receipt of said initialization process completion signal by either said initialization diagnostic unit or said display device control unit from said CPU.

14. The controller of claim 9, wherein said reset signal is received by said CPU immediately after power is applied to said image forming apparatus.

15. The controller of claim 9, wherein said initialization diagnostic unit operates independently from said CPU after said reset signal is received by said CPU and prior to receipt of said initialization process completion signal by either said initialization diagnostic unit or said display device control unit from said CPU.

16. A method for driving an image forming apparatus, comprising the steps of:
- determining whether or not a reset signal is received by a central processing unit (CPU), a display device control unit, and an initialization diagnostic unit, allowing a display device to be temporarily controlled by said initialization diagnostic unit via said display device control unit;
- determining whether an initialization process completion signal is received from said CPU by either said initialization diagnostic unit or said display device control unit prior to the expiry of a predetermined time after said reset signal is received; and
- controlling said display device control unit so that an error message may be displayed on said display device when said initialization process completion signal not received prior to said expiry of said predetermined time.

17. The method of claim 16, wherein said initialization diagnostic unit operates independently from said CPU and controls said display device after said reset signal is received by said CPU, said display device control unit and said initialization diagnostic unit and prior to receipt of said initialization process completion signal from said CPU by either said initialization diagnostic unit or said display device control unit.

18. The method of claim 17, wherein initialization progress information is displayed on said display device after said reset signal is received by said CPU, said display device control unit and said initialization diagnostic unit and prior to said expiry of said predetermined time after said reset signal is received.

19. The method of claim 16, wherein the step of determining whether or not a reset signal is received is preceded by applying power to said image forming apparatus.

* * * * *